US006800977B1

(12) United States Patent
Ostovic

(10) Patent No.: US 6,800,977 B1
(45) Date of Patent: Oct. 5, 2004

(54) FIELD CONTROL IN PERMANENT MAGNET MACHINE

(75) Inventor: Vlado Ostovic, Weinhem (DE)

(73) Assignee: Ford Global Technologies, LLC., Dearborn, MI (US)

( * ) Notice: Subject to any disclaimer, the term of this patent is extended or adjusted under 35 U.S.C. 154(b) by 0 days.

(21) Appl. No.: 09/517,256

(22) Filed: Mar. 2, 2000

(30) Foreign Application Priority Data

| Sep. 9, 1999 | (DE) | 199 43 274 |
| Sep. 29, 1999 | (DE) | 199 46 648 |
| Nov. 9, 1999 | (DE) | 197 57 502 |
| Nov. 15, 1999 | (DE) | 198 14 759 |

(51) Int. Cl.[7] .......................................... H02K 21/12
(52) U.S. Cl. ................... 310/156.38; 310/185; 310/261
(58) Field of Search ..................... 310/156.01, 156.15, 310/156.68, 156.38, 216, 261, 162, 185, 164, 174, 211, 198; 318/773

(56) References Cited

U.S. PATENT DOCUMENTS

| 3,164,734 | A | * | 1/1965 | Heinzen ..................... 200/35 R |
| 3,219,861 | A | * | 11/1965 | Burr ............................ 310/268 |
| 3,237,034 | A | * | 2/1966 | Krasnow ................. 310/156.23 |
| 3,619,730 | A | * | 11/1971 | Broadway et al. .......... 318/776 |
| 3,686,553 | A | * | 8/1972 | Broadway et al. .......... 318/737 |
| 3,840,763 | A | * | 10/1974 | Baumann et al. ....... 310/156.56 |
| 3,973,154 | A | * | 8/1976 | Broadway et al. .......... 310/184 |
| 4,139,790 | A | * | 2/1979 | Steen ...................... 310/156.83 |
| 4,144,470 | A | * | 3/1979 | Auinger ...................... 310/198 |
| 4,168,459 | A | | 9/1979 | Roesel, Jr. |
| 4,177,414 | A | | 12/1979 | Roesel, Jr. et al. |
| 4,188,554 | A | * | 2/1980 | Binns ..................... 310/156.78 |
| 4,227,136 | A | | 10/1980 | Roesel, Jr. |
| 4,242,610 | A | * | 12/1980 | McCarty et al. ........ 310/156.59 |
| 4,327,302 | A | * | 4/1982 | Hershberger ........... 310/156.56 |
| 4,405,873 | A | * | 9/1983 | Nondahl .................. 310/156.56 |
| 4,406,950 | A | | 9/1983 | Roesel, Jr. |
| 4,412,170 | A | | 10/1983 | Roesel, Jr. |
| 4,417,168 | A | * | 11/1983 | Miller et al. ............ 310/156.52 |
| 4,442,368 | A | * | 4/1984 | Kupisiewicz et al. ........ 310/201 |
| 4,469,970 | A | * | 9/1984 | Neumann ............... 310/156.78 |
| 4,600,873 | A | | 7/1986 | Roesel, Jr. et al. |
| 4,658,167 | A | * | 4/1987 | Popov et al. ........... 310/156.55 |
| 4,663,536 | A | | 5/1987 | Roesel, Jr. et al. |
| 5,013,951 | A | * | 5/1991 | Stadnik et al. .......... 310/156.07 |
| 5,097,166 | A | * | 3/1992 | Mikulic .................. 310/156.83 |
| 5,128,575 | A | * | 7/1992 | Heidelberg et al. ..... 310/156.41 |
| 5,191,256 | A | * | 3/1993 | Reiter, Jr. et al. ........... 310/156 |
| 5,280,209 | A | * | 1/1994 | Leupold et al. ......... 310/156.41 |
| 5,298,827 | A | * | 3/1994 | Sugiyama ..................... 310/156 |
| 5,717,316 | A | * | 2/1998 | Kawai .......................... 322/46 |
| 5,744,888 | A | * | 4/1998 | Zajc et al. .................... 310/185 |
| 5,864,197 | A | * | 1/1999 | Naito et al. ................... 310/261 |
| 5,873,890 | A | * | 2/1999 | Porat ............................ 128/887 |
| 5,929,541 | A | * | 7/1999 | Naito et al. ..................... 310/12 |
| 5,973,431 | A | * | 10/1999 | Li et al. ......................... 310/168 |
| 5,977,679 | A | * | 11/1999 | Miller et al. .................. 310/164 |
| 6,005,318 | A | * | 12/1999 | Pop, Sr. .................. 310/156.57 |
| 6,147,428 | A | * | 11/2000 | Takezawa et al. ........... 310/156 |
| 6,384,504 | B1 | * | 5/2002 | Ehrhart et al. .......... 310/156.55 |

FOREIGN PATENT DOCUMENTS

| DE | 19757502 A1 | * | 6/1999 | ............ H02K/1/27 |
| JP | 407236260 A | * | 9/1995 | .......... H02K/21/14 |

* cited by examiner

Primary Examiner—Joseph Waks
(74) Attorney, Agent, or Firm—Carlos L. Hanze

(57) ABSTRACT

A multi-pole rotor of an electric machine includes ferromagnetic pole sets each extending from an inner surface of the rotor to an outer surface of the rotor, slots separating each of said ferromagnetic pole segments, each of said slots extending from the inner surface of the rotor to the outer surface of the rotor, and each of said slots also having a width varying along a direction from the inner surface of the rotor to the outer surface of the rotor, and a magnet structure constructed and arranged within each of said slots such that said magnet structure also has a width varying along the direction from the inner surface of the rotor to the outer surface of the rotor.

3 Claims, 4 Drawing Sheets

FIELD CONTROL IN PERMANENT MAGNET MACHINE

TECHNICAL FIELD OF THE INVENTION

The present invention relates generally to electrical machines, and more particularly, to synchronous machines with permanent magnets.

BACKGROUND

Synchronous machines with permanent magnets find application in various electric drives fed from inverters due to their high efficiency and no need for rotor cooling. These two advantages, along with minimum rotor maintenance need (no slip rings and brushes), make a permanent magnet (PM) synchronous machine the choice number one in numerous applications, when compared with a wound rotor synchronous machine.

The better utilization of rotor volume in a PM machine has, however, a price. The induced voltage in the stator winding of a wound rotor synchronous machine can be controlled by the field current This possibility does not exist in a conventional PM synchronous machine, since the magnetization of permanent magnets is constant. When the speed of a wound rotor synchronous machine increases, its stator induced voltage can be kept constant or decreased by decreasing the field current. When, however, the speed of a PM synchronous machine increases, its stator induced voltage increases proportionally. At certain speed the stator induced voltage reaches the maximum allowed amount, determined by winding insulation properties and inverter voltage capability. Above that speed the drive cannot operate safely due to risk of equipment damage.

Another characteristic of a conventional PM synchronous machine is its constant number of poles. This is not always the case in a squirrel cage induction machine, the rotor of which has as many poles as its stator. By changing the number of stator poles in a squirrel cage induction machine, the number of rotor poles changes too, which enables machine generate torque at any pole number. This way, the speed range of a squirrel cage induction machine can be extended:

In an arbitrary ratio by using separate winding for each polarity;
In a ratio 2:1 with Dahlander connected stator winding;
In a ratio p: (p±2) with pole-amplitude modulated (PAM) stator winding, where p stands for the number of poles
In an arbitrary ratio with pole-phase modulated (PPM) stator winding, as shown in U.S. Pat. No. 5,977,679.

A conventional PM rotor has a rigid magnetic structure which does not allow any change of the number of poles. Therefore, the speed range of a conventional synchronous machine with PM rotor cannot be increased by changing the number of its poles. Any attempt to change the number of stator poles without changing the number of rotor poles of an electric machine results in machine malfunctioning. A PM machine with different number of stator and rotor poles draws excessive currents from the source, without delivering any useful mechanical torque on the shaft.

When loaded, a conventional PM synchronous machine demonstrates another shortcoming: the load currents in the stator winding create their own magnetic field which distorts the field of permanent magnets (armature reaction). Since the field of permanent magnets has a constant amplitude and is fixed to the rotor surface, the load current distorts the resulting air gap field. This way, the stator induced voltage becomes a function of the load current, limiting possible applications of a conventional PM synchronous machine as a generator.

SUMMARY

The present invention is directed to overcoming the problems related to rigid rotor magnetization and single-speed capability in conventional PM machines. Briefly summarized, both the shape and magnitude of magnetic field distribution along the rotor circumference are controlled in this invention by means of current(s). The control current(s) can flow only during time interval in which a new magnetic state is created, or permanently. When the rotor magnetization is controlled by additional stator currents the stator of the proposed machine draws during regular run only the load current.

A rotor of a synchronous machine has iron segment (1) and a plurality of tangentially magnetized permanent magnets (2), (3) per pole with different radial dimensions. On the stator side a conventional AC winding carries stator currents during normal operation. During short remagnetization phase an additional component of stator current provides for change of magnetization direction in a portion of longer magnets.

A rotor of a synchronous machine has two iron segments (4), a wedge (24), and a trapezoidally shaped permanent magnet (5) per pole. A conventional AC winding on the stator side carries during a short period of time an additional current component, which remagnetizes a portion of the magnet closer to the rotor bore. The radial height of the remagnetized magnet portion is proportional to the remagnetizing current.

A rotor of a synchronous machine has optional squirrel cage bars (25), along with several trapezoidally formed iron yoke segments (6) and rectangular permanent magnets (7) per pole. The stator (8) is slotted, whereas the slots (9) carry a pole changing Dablander winding, or a pole-amplitude modulated (PAM) winding, or a pole-phase modulated (PPM) winding, as described in U.S. Pat. No. 5,977,679.

When the stator number of poles is changed, the stator winding draws temporarily an additional component of current which remagnetizes the rotor magnets in such a manner that the number of rotor poles is equal to the number of stator poles. The optional rotor cage generates torque which can bring the rotor into new synchronous speed after changing the number of poles.

A rotor of a synchronous machine has optional squirrel cage bars (26), along with several rectangular iron yoke segments (10) and trapezoidal permanent magnets (11) per pole. The stator (12) is slotted, whereas slots (13) carry a pole changing Dahlander winding, or a pole-amplitude modulated (PAM) winding, or a pole-phase modulated (PPM) winding, as described in U.S. Pat. No. 5,977,679.

When the stator number of poles is changed, the stator winding draws temporary an additional component of current which remagnetizes the rotor magnets in such a manner that the number of rotor poles is equal to the number of stator poles. The optional rotor cage generates torque, which can bring the rotor into new synchronous speed after changing the number of poles. After changing the number of poles, the stator winding can carry during a short period of time an additional current component which remagnetizes portions of the magnets closer to the rotor bore The size of remagnetized magnet portion is proportional to the amplitude of remagnetizing current.

A rotor of a synchronous machine has two magnets per pole, the main magnet (14) and the auxiliary magnet (15), as well as iron segments (16). The main magnet provides for machine excitation. The auxiliary magnet compensates for the armature reaction field created by the stator current.

A rotor of a synchronous machine has one magnet per pole (18), one iron segment per pole (19), and several independently driven coils per pole (17). The coil currents are chosen so to create the magnetic field which acts in the same direction as the magnet field, or to he spatially shifted to the magnet field. In the former case, the coil current helps control the amount of induced voltage in the stator winding. In the latter case, the coil current can compensate for armature reaction of the stator winding.

A rotor of a synchronous machine has one tangentially (21) and one radially (23) oriented magnet per pole, several independently fed coils (20), and iron segments (22). The three sources of magnetic flux (two magnets and coils) combine their action in such a manner to fully compensate for effects of stator armature reaction.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

These and other features, aspects and advantages of the present invention will become better understood with regard to the following description, appended claims and accompanying drawings where:

DETAILED DESCRIPTION OF THE DRAWINGS

Figure 1:
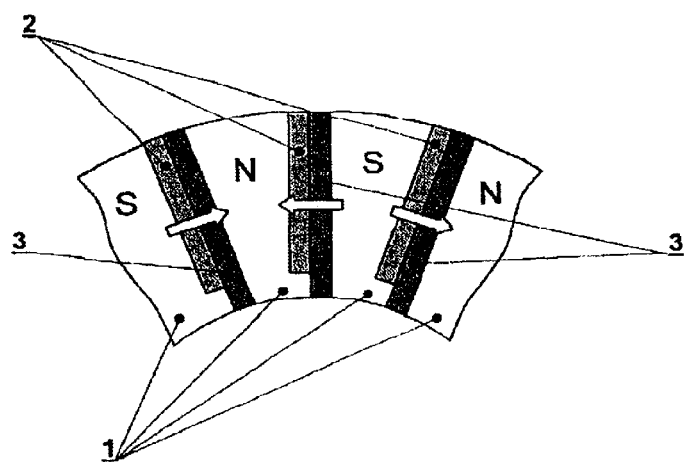
FIG. 1 is a view of a section of the rotor lamination, showing iron poles (1), short permanent magnets (2), and long permanent magnets (3). The directions of magnetization of permanent magnets are indicated with arrows.

FIG. 1, the rotor of a PM machine is built out of pole segments (1), and a plurality of permanent magnets (2), (3) per pole. The magnets (2) and (3) are magnetized so that their flux goes through the rotor yoke segments as shown with arrows in FIG. 1. With given magnetization directions, the sequence of poles on the rotor circumference is N-S-N-S-etc. The rotor structure in FIG. 1 enables discrete change of the induced voltage in the stator winding, as will be illustrated in the following discussion.

The rotor in FIG. 1 is placed in a stator with ordinary polyphase winding, fed presumably, but not necessarily, from an inverter which enables separate control of d-and q-axis currents. Assume that the rotor rotates at a given speed, and that the stator induced voltage has to be decreased for a fixed amount. In order to do that, additional component of current is forced to flow temporarily through the stator windings, the magnetic field of which is opposed to the magnetic field created by magnets 2 and 3. The amplitude of this control current is chosen in such a manner, that its magnetic field remagnetizes only those portions of permanent magnets (3) which are placed closer to the rotor bore, whereas the magnetization of the rest of magnets (3), as well of the whole magnets (2) remains unchanged. After the control current has flown for a short period of time, the magnets (2), as well as portions of magnets (3) leaning on magnets (2) are magnetized so to drive the flux through rotor poles in the same direction as before. The parts of magnets (3) closer to the rotor bore, i.e. the ones surrounded completely by pole segments (1), have changed their magnetization directions in such a manner, that they now oppose the flux of the (predominating) rest of magnets (3) and complete magnets (2). As a result, the total flux per pole produced by rotor magnets is smaller than before, and the induced voltage in the stator winding decrease.

Figure 2:
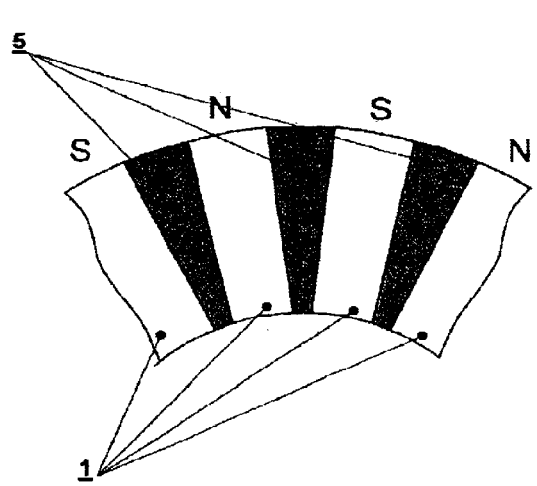
FIG. 2a) is a view of a section in the rotor lamination showing trapezoidal permanent magnets (5) and arbitrarily shaped iron poles (1).
FIG. 2b) is a view of a section of the rotor lamination, showing iron pole segments (4), trapezoidal permanent magnets (5), and wedges (24).
Figure 2:
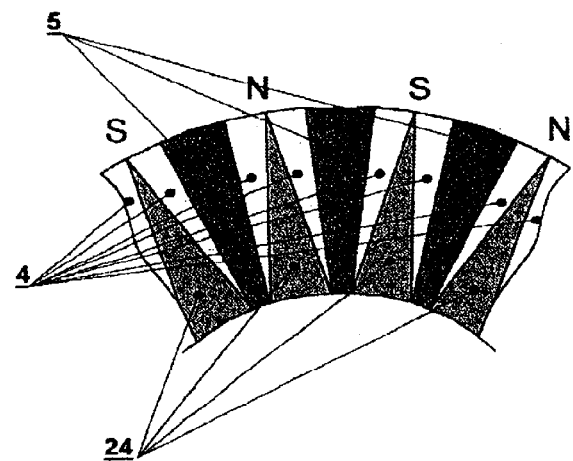

FIG. 2a) and b), the induced voltage in a PM synchronous machine can also be controlled continuously. In order to provide a possibility for continuous, or arbitrary change of the induced voltage, the rotor has to be built as shown in FIGS. 2a) and b). The soft iron poles (1) or pole segments (4) are surrounded by trapezoidal permanent magnets (5). The trapezoidal form of permanent magnets enables variation of the radial height of remagnetized portion of magnets (5) as a functions of the stator remagnetizing current. Thus, at a given speed an arbitrary induced voltage in the stator winding can be obtained only by controlling the amplitude of the remagnetizing current. If the wedges (24) are made out of non-magnetic material, the armature reaction flux in the q-axis is minimized.

Figure 3:
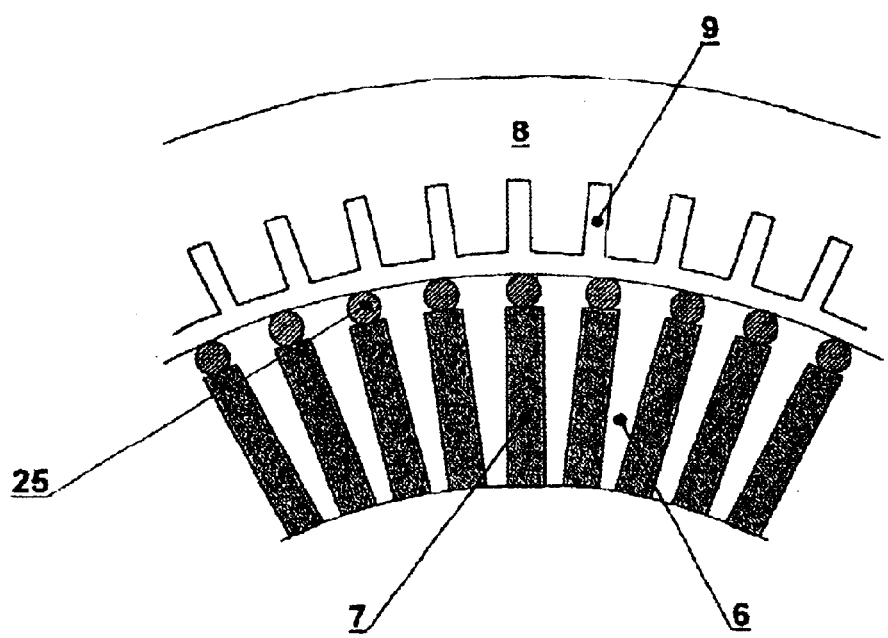
FIG. 3 is a cross-sectional view of a portion of the stator and rotor lamination, showing iron segments of the rotor (6), rectangular shaped rotor permanent magnets (7), optional squirrel cage bars (25), and stator (8) with stator slots (9).

FIG. 3, a synchronous machine with PM rotor can operate at various number of poles. Each rotor pole of the pole-changing PM machine contains optional squirrel cage bars (25), a plurality of trapezoidal soft iron segments (6), and rectangular permanent magnets (7), whereas stator (8) carries either more than one winding, or a Dahlander, PAM or PPM winding in slots (9).

When the machine shown in FIG. 3 is running at a given speed and with a given number of poles, the rotor magnets are magnetized predominantly in tangential direction, and the squirrel cage is not active. Immediately after the number of poles has been changed by the action of stator winding, additional component of stator current in reconnected stator windings, or current(s) in additional stator winding(s) will flow remagnetizing the permanent magnets (7), thus setting a new number of poles in the rotor. This current generates a torque with rotor cage currents. The change of the number of rotor poles is caused by appropriate stator winding reconnection, so that the number of poles on the both sides of the air gap is equal. The remagnetizing component of the stator current flows only a short period of time, just enough to change the direction of magnetization in rotor magnets.

Figure 4:
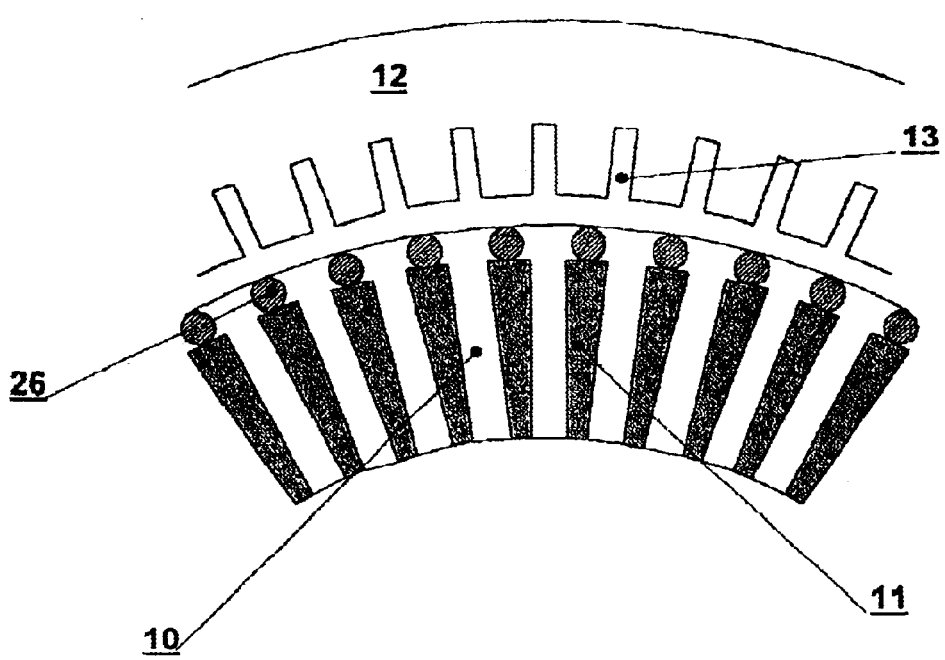
FIG. 4 is a cross-sectional view of a portion of the stator and rotor lamination, showing iron segments of the rotor (10), trapezoidal rotor permanent magnets (11), optional squirrel cage bars (26), and stator (12) with stator slots (13).

FIG. 4, a PM synchronous machine that can operate with variable number of poles and variable induced voltage consists of a plurality of soft iron segments (10) per rotor pole, a plurality of trapezoidal magnets (11) per rotor pole, optional squirrel cage (26), and the stator (12) with slots (13), in which the winding is placed. The stator windings can be reconnected mechanically and/or electronically, resulting in a new number of stator poles. The rotor in this figure can be obtained as a combination of the rotors in FIGS. 2 and 3.

When the rotor in FIG. 4 is running at a certain speed, the induced voltage in the stator winding can be controlled by temporarily flowing control currents in the stator windings. The amplitude and phase shift of the control currents are chosen in such a manner that only a portion of the rotor magnets is remagnetized.

When the number of poles of the rotor in FIG. 4 has to be changed, additional component of stator current in reconnected stator windings, or current in additional stator winding(s) flows, which is large enough to fully remagnetizes permanent magnets (11).

Figure 5:
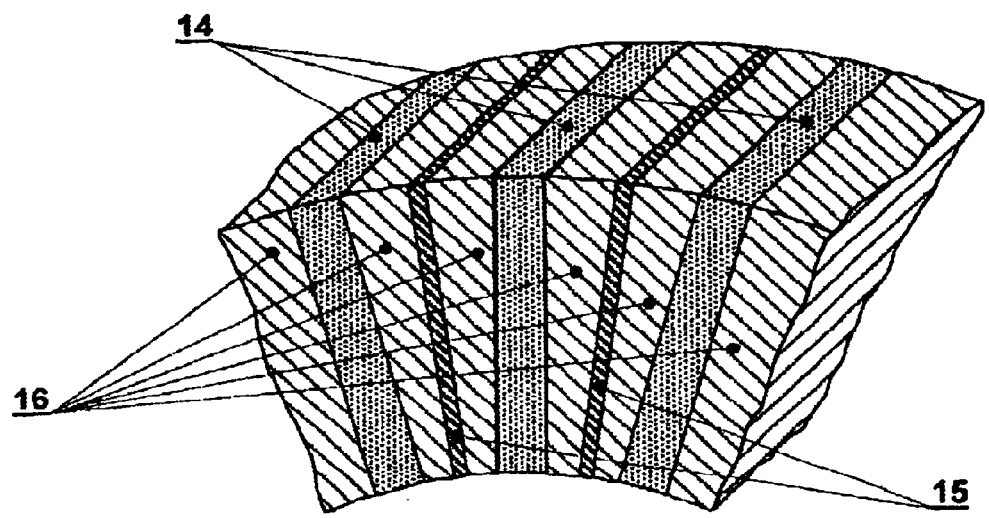
FIG. 5 is a perspective view of a portion of the rotor core showing main field permanent magnets (14), auxiliary magnets (15), and rotor yoke soft magnetic material segments (16).

FIG. 5, the rotor of a PM synchronous machine with improved air gap field distribution consists of tangentially magnetized main field magnets (14), auxiliary field magnets (15), and soft iron pole segments (16). When loaded with stator current at a given power factor, a PM synchronous generator based on this principle has an improved air gap flux distribution as compared to a standard generator. The reason for this is the magnetic field of auxiliary magnets (15), which can be so dimensioned to fully compensate for the effects of armature reaction at a given load and power factor.

Figure 6:
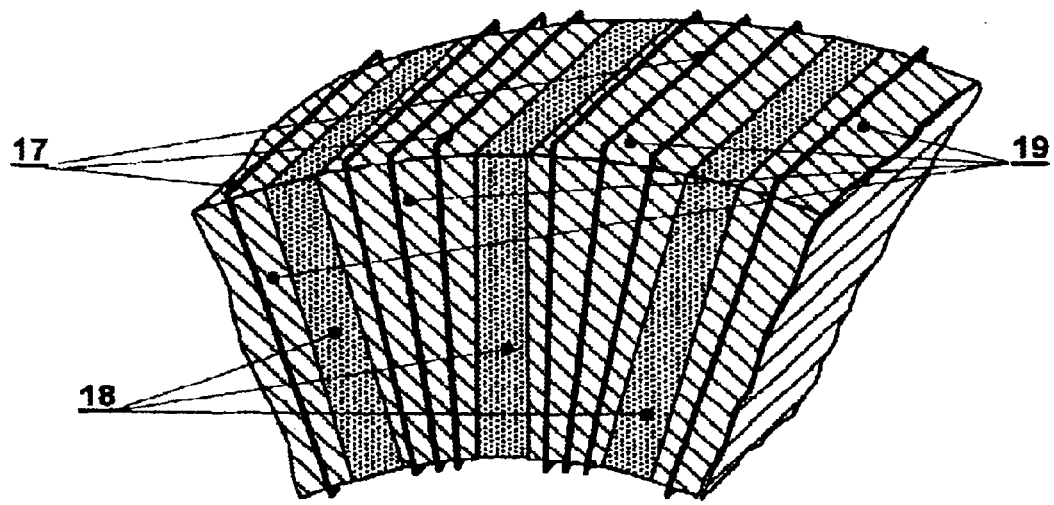
FIG. 6 is a perspective view of a portion of the rotor core showing compensation winding coils (17), main field permanent magnets (18), and rotor yoke segments made of soft magnetic material (19).

FIG. 6, the rotor of a PM synchronous machine with full field control capability consists of control coils (17), permanent magnets (18) and soft iron pole segments (19). The permanent magnets are either tangentially magnetized, as shown in FIG. 6, or radially magnetized. Each control coil can carry a separate current. The magnetic field created by control currents can improve the machine performance in two manners: as an additional field excitation, or to compensate the armature reaction.

When the control coils are connected to create magnetic field in the direction of magnetic field of permanent magnets, the resulting field is determined both by permanent magnets and control current. The main flux is created partially by permanent magnets, and partially by the control current. This way less current losses I²R are needed to build the main flux.

When the control coils carry currents which create magnetic field spatially shifted to the field of permanent magnets, they can be used to compensate for the stator armature reaction. The control currents create an additional component of the air gap field, which compensated for the armature reaction field of the stator currents.

Figure 7:
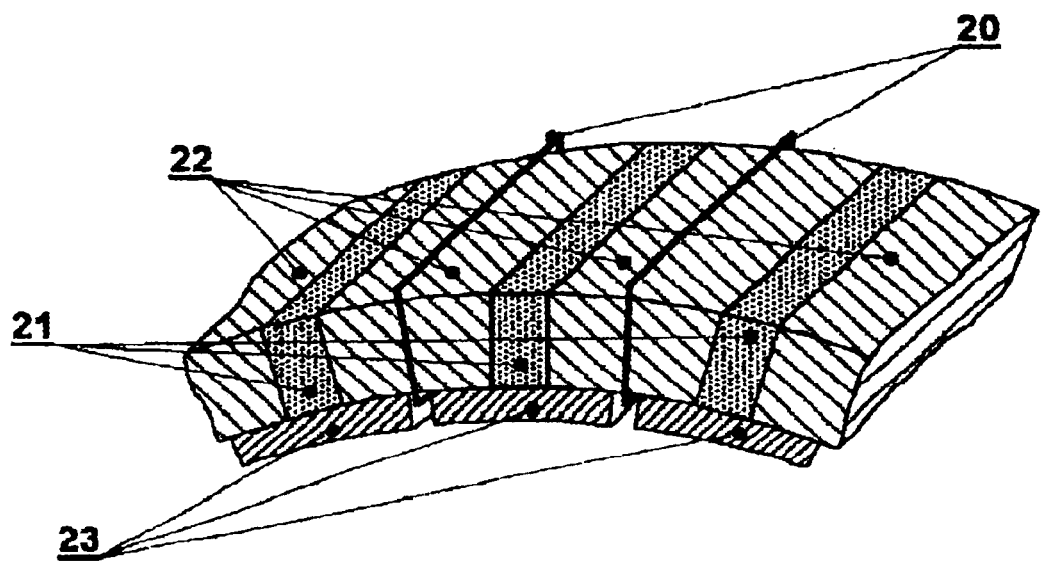
FIG. 7 is a perspective view of a portion of the rotor core showing compensation winding coils (20), main field permanent magnets (21), rotor yoke segments made of soft magnetic material (22), and auxiliary magnets (23).

FIG. 7, the rotor of a PM synchronous machine with improved full field control capability consists of control coils (20), tangentially magnetized permanent magnets (21), rotor yoke iron segments (22) and radially magnetized permanent magnets (23). The main magnetic field, created by tangential and/or radial magnets is modified by currents in control coils. The action of auxiliary magnets and control currents is identical as described in sections related to FIGS. 5 and 6.

It will be now appreciated that here have been presented synchronous machines with permanent magnets. The rotors of presented machines are built out of soft iron segments and permanent magnets. Some rotors have squirrel cages, or current carrying coils in addition. The rotor flux can be modified either by remagnetization of permanent magnets, or by an action of the control current. The stators of presented machines have either several separate single-speed windings, or a multiple-speed winding. The multiple-speed windings can be built either after Dahlander principle, or as pole-amplitude modulated (PAM), or pole-phase modulated (PPM) winding, as described in U.S. Pat. No. 5,977,679.

While the invention has been described with particular reference to a preferred embodiment, it will be understood by those skilled in the art that various changes may be made and equivalents may be substituted for elements of the preferred embodiment without departing from invention. As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

Although the present invention has been described in detail with reference to certain preferred embodiments, other embodiments are possible. Therefore, the spirit and scope of the appended claims should not be limited to the description of the preferred embodiments herein.

What is claimed is:

1. A multi-pole rotor of an electric machine, comprising:

ferromagnetic pole segments each extending from an inner surface of the rotor to an outer surface of the rotor;

slots separating each of said ferromagnetic pole segments, each of said slots extending from the inner surface of the rotor to the outer surface of the rotor, and each of said slots also having a width varying along a direction from the inner surface of the rotor to the outer surface of the rotor; and a magnet structure constructed and arranged within each of said slots such that said magnet structure also has a width varying along the direction from the inner surface of the rotor to the outer surface of the rotor, wherein said magnet structure comprises at least two permanent magnets disposed immediately adjacent to each other each having a rectangular cross section.

2. The multi-pole rotor according to claim 1, wherein the width of said slots varies in a stepwise manner in the direction from the inner surface of the rotor to the outer surface of the rotor.

3. A multi-pole rotor of an electric machine, comprising:

ferromagnetic pole segments each extending in a radial direction from an inner surface of the rotor to an outer surface of the rotor;

slots separating each of said ferromagnetic pole segments, each of said slots extending radially from the inner surface of the rotor to the outer surface of the rotor, each of said slots having a radial slot height defined along a direction from the inner surface of the rotor to the outer surface of the rotor, and each of the slots also having a width varying along said slot height in a stepwise manner such that a first slot portion extends entirely from the inner surface of the rotor to the outer surface of the rotor and at least a second slot portion extends from the outer surface of the rotor but not entirely to the inner surface of the rotor; and a magnet structure constructed and arranged within each of said slots, said magnet structure comprising a first permanent magnet having a rectangular cross-section disposed within the first slot portion and at least a second permanent magnet having a rectangular cross-section disposed within the second slot portion.

* * * * *